United States Patent
Zalucki et al.

(10) Patent No.: US 11,139,883 B1
(45) Date of Patent: Oct. 5, 2021

(54) COMBINED SPATIAL AND TIME MULTIPLEXER

(71) Applicant: BAE Systems Information and Electronic Systems Integration Inc., Nashua, NH (US)

(72) Inventors: Michael A. Zalucki, Hollis, NH (US); Tyler Hayslett, Nashua, NH (US)

(73) Assignee: BAE Systems Information and Electronic Systems Integration Inc, Nashua, NH (US)

(*) Notice: Subject to any disclaimer, the term of this patent is extended or adjusted under 35 U.S.C. 154(b) by 0 days.

(21) Appl. No.: 17/018,308

(22) Filed: Sep. 11, 2020

(51) Int. Cl.
| | |
|---|---|
| *H04B 7/08* | (2006.01) |
| *H04W 72/04* | (2009.01) |
| *H04L 5/00* | (2006.01) |

(52) U.S. Cl.
CPC ......... *H04B 7/0891* (2013.01); *H04L 5/0025* (2013.01); *H04W 72/046* (2013.01); *H04W 72/0446* (2013.01)

(58) Field of Classification Search
CPC ............ H04B 7/0891; H04W 72/0446; H04W 72/046; H04L 5/0025
See application file for complete search history.

(56) References Cited

U.S. PATENT DOCUMENTS

| | | | | |
|---|---|---|---|---|
| 5,123,012 A * | 6/1992 | Suzuki | ........... | H04Q 11/08 370/379 |
| 5,760,602 A * | 6/1998 | Tan | ........... | G11C 11/419 326/38 |
| 5,862,403 A * | 1/1999 | Kanai | ........... | G06F 3/0601 710/6 |
| 6,037,884 A * | 3/2000 | Thornton | ........... | H04L 5/02 341/53 |
| 7,492,760 B1 * | 2/2009 | Plante | ........... | H04Q 11/04 370/363 |
| 8,819,505 B2 * | 8/2014 | Vorbach | ........... | G11C 29/78 714/724 |
| 2011/0055491 A1 * | 3/2011 | Chin | ........... | H04L 49/9036 711/149 |
| 2018/0025757 A1 * | 1/2018 | Chan | ........... | G11C 7/1045 365/189.02 |

* cited by examiner

Primary Examiner — Jean B Corrielus
(74) Attorney, Agent, or Firm — Finch & Maloney PLLC

(57) ABSTRACT

A combined spatial and time multiplexer device is disclosed. The device organizes and selects any signal(s), including past data, from amongst a plurality of time division multiplexed (TDM) data streams. The data streams are collected by memory devices that are configured to separately store the multiplexed signals such that different time portions of the signals from each data stream are stored in different addressable sections. This allows for the current time data and past time data for a given signal to be selected and outputted by the device. According to an embodiment, each of the memory devices receives an address select signal and selects a signal group based on the address select signal. The device also includes a multiplexer that selects one of the signal groups from amongst the memory devices to output as the requested signal group.

20 Claims, 6 Drawing Sheets

COMBINED SPATIAL AND TIME MULTIPLEXER

GOVERNMENT LICENSE RIGHTS

This invention was made with United States Government assistance. The United States Government has certain rights in this invention.

BACKGROUND

Some applications involve receiving and/or transmitting multiple time-division multiplexed (TDM) streams of data. Data streams of this type are commonly used in high bandwidth processing applications, where many individual streams are time multiplexed to share combinational logic. Multiple physical streams are often used as well when the combinational logic can't be clocked fast enough to process all of the individual streams. When this happens, the time multiplexed streams are broken up into multiple physical streams. Sometimes, an application has a need for past data of a given signal in one of the time-division multiplexed streams. This can be challenging when stream selection occurs after the desired data has passed. Accordingly, there are many non-trivial issues with regards to signal selection from amongst multiple TDM data streams.

BRIEF DESCRIPTION OF THE DRAWINGS

Features and advantages of embodiments of the claimed subject matter will become apparent as the following Detailed Description proceeds, and upon reference to the Drawings, in which:

Figure 1:
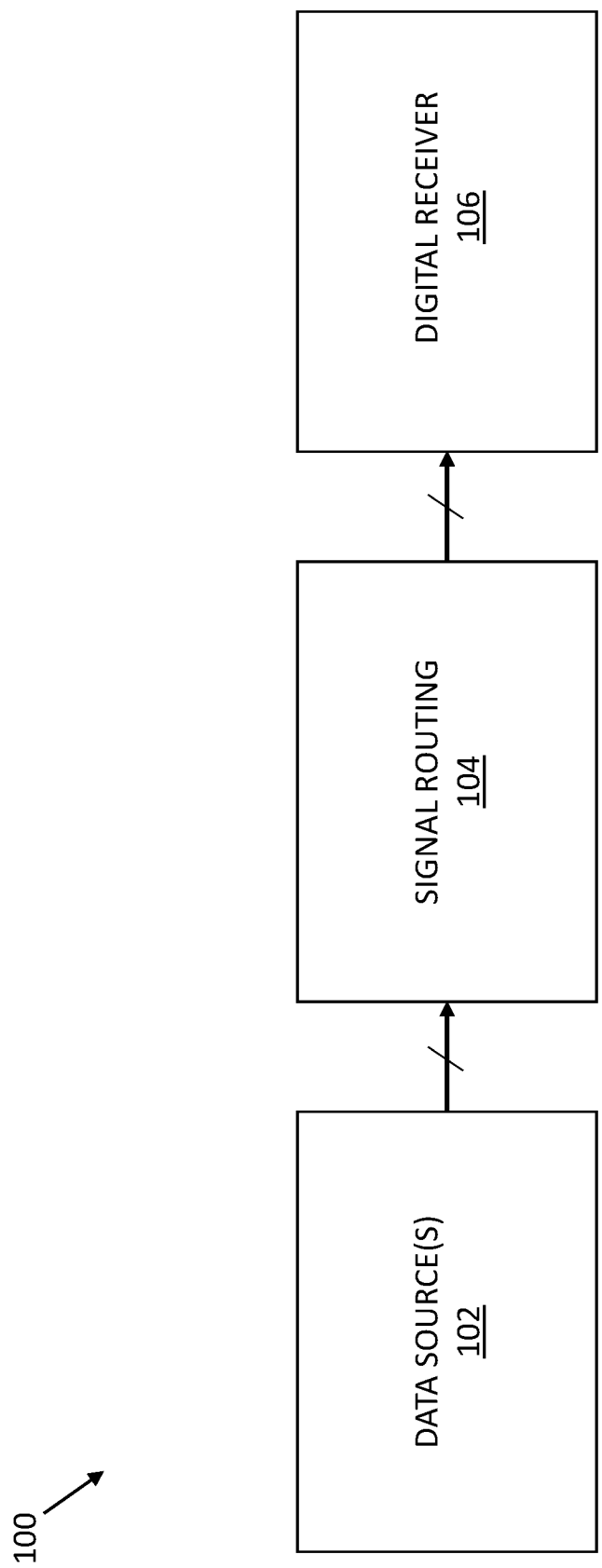
FIG. 1 illustrates a block diagram of a signaling environment, in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

A combined spatial and time multiplexer device is disclosed. Such a device may be used, for example, within a digital receiver to organize and select any signal(s) from amongst a plurality of time division multiplexed (TDM) data streams. Multiple TDM data streams may be received from various signal sources, or from a single signal source. In an embodiment, each of the data streams are in a time-division multiplexed format, and each stream is collected by a corresponding memory structure. Each memory structure is configured to separately store the multiplexed signals of the corresponding stream, such that different time portions of the individual signals from a given data stream are stored in different addressable sections of the memory structure corresponding to that stream. This allows for the current time data and past time data for a given individual signal to be selected and outputted by the multiplexer device. According to some such embodiments, each of the memory structures storing signal group data from a given data stream is designed to receive an address select signal and to select a signal group based on the address select signal. The device also includes a multiplexer that selects one of the signal groups from amongst the memory devices to output as the requested signal group. Numerous embodiments and variations will be appreciated in light of this disclosure.

General Overview

Time division multiplexed data streams are commonly demultiplexed at a receiver to recover the various signal data on a given data stream. However, requesting a signal from a given data stream does not provide past data points of the requested signal—only the current and possibly future data points of the requested signal. This can lead to some data being lost, or to a desirable portion of the data being missed if the request for the data occurs after the data has already passed through the receiver. As will be appreciated in light of this disclosure, allowing time multiplexing and spatial multiplexing simultaneously allows for complete boundless processing at a receiver when that receiver is presented with multiple time-multiplex streams of data.

Thus, and according to an embodiment of the present disclosure, a spatial and time multiplexer device (herein referred to as an ST multiplexer) is provided that selects a particular signal from amongst a plurality of TDM streams and retrieves both current and past data points of the selected signal. The TDM signals may be received from various signal sources, or from a single source, such as when combinatorial logic at the signal source cannot be clocked fast enough, so the data is split into different physical data streams. The ST multiplexer may be constructed, for example, as a field programmable gate array (FPGA) or an application specific integrated circuit (ASIC). In some such embodiments, the ST multiplexer includes hardware definable using a hardware description language (HDL) such as Very High-Speed Integrated Circuit Hardware Description Language (VHDL) or Verilog. The ST multiplexer receives an input from a user or application for one or more signals and decodes the input into different selection signals in order to select both a particular data stream from the plurality of TDM streams and a particular portion of the selected data stream corresponding to the desired one or more signals. The selected portion of the data stream may include, for instance, current and past data points associated with the desired one or more signals, according to some such example embodiments.

In one specific embodiment, a digital receiver is designed to receive a plurality of time-multiplexed data streams. The digital receiver includes a plurality of memory devices and a multiplexer. Each of the plurality of memory devices is designed to receive a given data stream of the plurality of time-multiplexed data streams, wherein the given data stream includes time-multiplexed data from a plurality of sources; store data of the given data stream within a plurality of groups, wherein each group contains data from a different source of the plurality of sources; receive an address select signal and select a group of the plurality of groups based on the address select signal; and output the data from the selected group as a time-selective data stream. The multiplexer is designed to receive the time-selective data stream from each of the plurality of memory devices; select one of the received time-selective data streams associated with one of the plurality of memory devices in response to a received stream select signal; and output the selected time-selective data stream. Numerous embodiments and variations will be appreciated in light of this disclosure.

Digital Signaling Environment

FIG. 1 illustrates an example digital signaling environment 100, according to an embodiment. Digital signaling environment 100 may represent any form of digital data transfer from one device to another. According to some embodiments, digital signaling environment 100 includes one or more data source(s) 102, signal routing 104, and a digital receiver 106. Digital receiver 106 may be part of a larger system that processes the received signals from data source(s) 102.

Data source(s) 102 may represent any number of electronic devices that produce digital signals. According to some embodiments, data source(s) 102 represent analog to digital converters (ADCs) from different electronic devices, where each of the ADCs produces a TDM signal having multiple digital signals time-multiplexed on one data stream. In some embodiments, data source(s) 102 represent different ADCs on a single electronic device. Other components may be used as well to produce digital TDM data streams as would be understood to a person skilled in the relevant arts.

Signal routing 104 may represent any routing infrastructure used to carry digital signals between devices, according to some embodiments. For example, signal routing 104 may represent an ethernet or fiberoptic network that receives the TDM data streams from data source(s) 102 and delivers the TDM data streams to digital receiver 106. In another example, signal routing 104 represents a wireless communication network across which the TDM data streams are transferred. Example wireless communication protocols include shorter-range wireless communications such as Wi-Fi or Bluetooth or longer-range wireless communications such as Global System for Mobile Communication (GSM), General Packet Radio Service (GPRS), Universal Mobile Telecommunications System (UMTS), High Speed Packet Access (HSPA), Evolved HSPA (E-HSPA), LTE, or others.

Digital receiver 106 is designed to receive the TDM data streams transmitted from data source(s) 102. According to some embodiments, digital receiver 106 includes an ST multiplexer that allows a user or application to select a particular signal from amongst the TDM data streams and receive both current and past data points of the signal as an output. Digital receiver 106 may also include other components used to amplify or filter the received TDM data streams and/or demodulate carrier signals used to transmit the TDM data streams.

Spatial and Time Multiplexer Architecture

Figure 2:
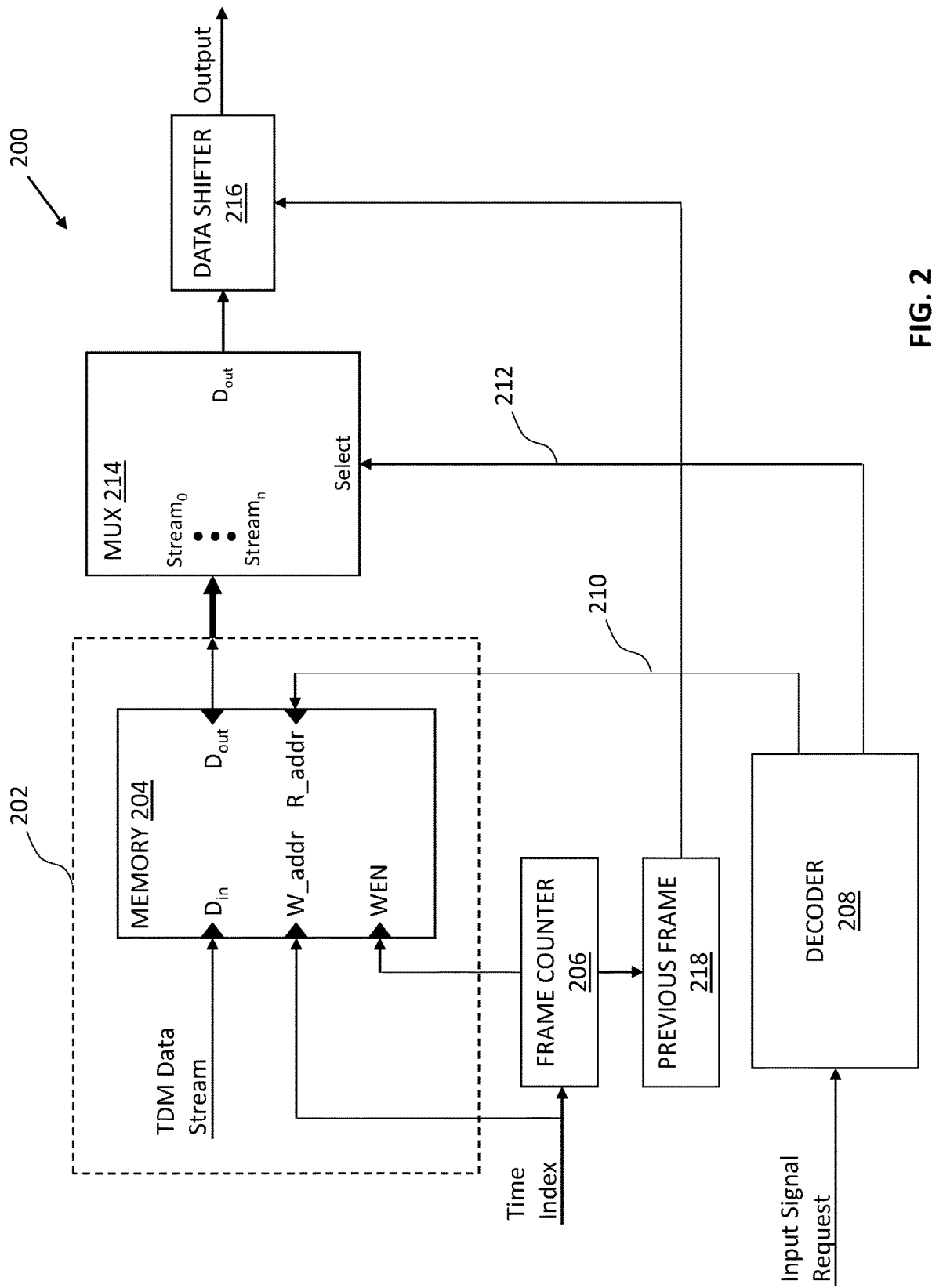
FIG. 2 illustrates a block diagram of a spatial and time multiplexing device, in accordance with an embodiment of the present disclosure.

FIG. 2 illustrates a block diagram of an ST multiplexer 200, according to an embodiment. ST multiplexer 200 may be included within a portion of digital receiver 106. ST multiplexer 200 includes various components and circuits that may be provided as different parts of an FPGA or an ASIC. Accordingly, the functionality of one or more of the illustrated components of ST multiplexer 200 may be coded using a hardware description language that is translated into a particular transistor or gate layout in the design of the FPGA or ASIC.

ST multiplexer 200 receives a plurality of TDM data streams, with each data stream being received at a corresponding receiving block 202 that includes a memory device 204 designed to receive one of the TDM data streams, according to an embodiment. Put another way, receiving block 202 is repeated for each of the received TDM data streams, and thus ST multiplexer 200 includes a different memory device 204 to store the data of each of the received data streams. Memory device 204 may be a dual-port random access memory device that includes one port (W_addr) for writing data to a particular memory address, and another port (R_addr) for reading data from a particular memory address. The dual port design allows for simultaneous data writes and data reads to occur. Another write enable port (WEN) may be used to control when data from the received TDM data stream is stored within memory 204. This allows for memory 204 to organize the data and keep track of historical data points associated with each of the different signals on the received TDM data stream. Data requested via the read port (R_addr) maybe outputted from $D_{out}$. Generally, memory device 204 may be provided using any common register-based memory. In some embodiments, memory device 204 comprises a random-access memory (RAM) architecture.

ST multiplexer 200 receives as an input a time index that identifies the time-modulation index of the received TDM data streams, according to an embodiment. For example, for TDM data streams that have an x4 timing modulation, the time index would indicate that every fourth timing frame of the TDM data stream proceeding from a given timing frame contains datapoints from the same signal. This is illustrated graphically in FIG. 3 where two example TDM data streams are provided having 8 different signals multiplexed across the two data streams. TDM stream 1 includes signals 0, 2, 4, and 6, with four different data points illustrated for each of the signals at different timing frames within TDM stream 1, while TDM stream 2 includes signals 1, 3, 5, and 7, with four different data points illustrated for each of the signals at different timing frames within TDM stream 2. The stream is chopped up in time with data points associated with a given signal only appearing at every fourth timing frame in the data stream since the example uses an x4 multiplexing scheme. The time index illustrated below the two data streams identifies the x4 multiplexing scheme being used. Put another way, index 0 is associated with the data points of signal 0 for TDM stream 1 and the data points of signal 1 for TDM stream 2, index 1 is associated with the data points of signal 2 for TDM stream 1 and the data points of signal 3 for TDM stream 2, and so forth. Although an x4 multiplexing scheme is illustrated and described in this example, any multiplexing scheme using any number of signals on a given TDM data stream may be used. The actual time duration of each timing frame may change based on the application and speed of the clocks involved. Each data point within the TDM data streams refers to a portion of data from the original signal and can include any number of bits.

The time index is received by a frame counter 206, according to an embodiment. Frame counter 206 may include a circular shift register having a single bit being a '1' while the rest of the bits are '0'. The number of bits in the shift register may be set based on the time index (e.g., equal to the time-modulation index of the modulating scheme). Based on the example TDM data streams of FIG. 3, frame counter 206 would include a circular shift register of four bits with one bit being '1' and the others being '0'. In some other schemes, the circular shift register includes one bit being a '0' while the other bits are '1'. According to an embodiment, frame counter 206 shifts the position of the '1' bit after each timing frame to track the data modulation.

Figure 3:
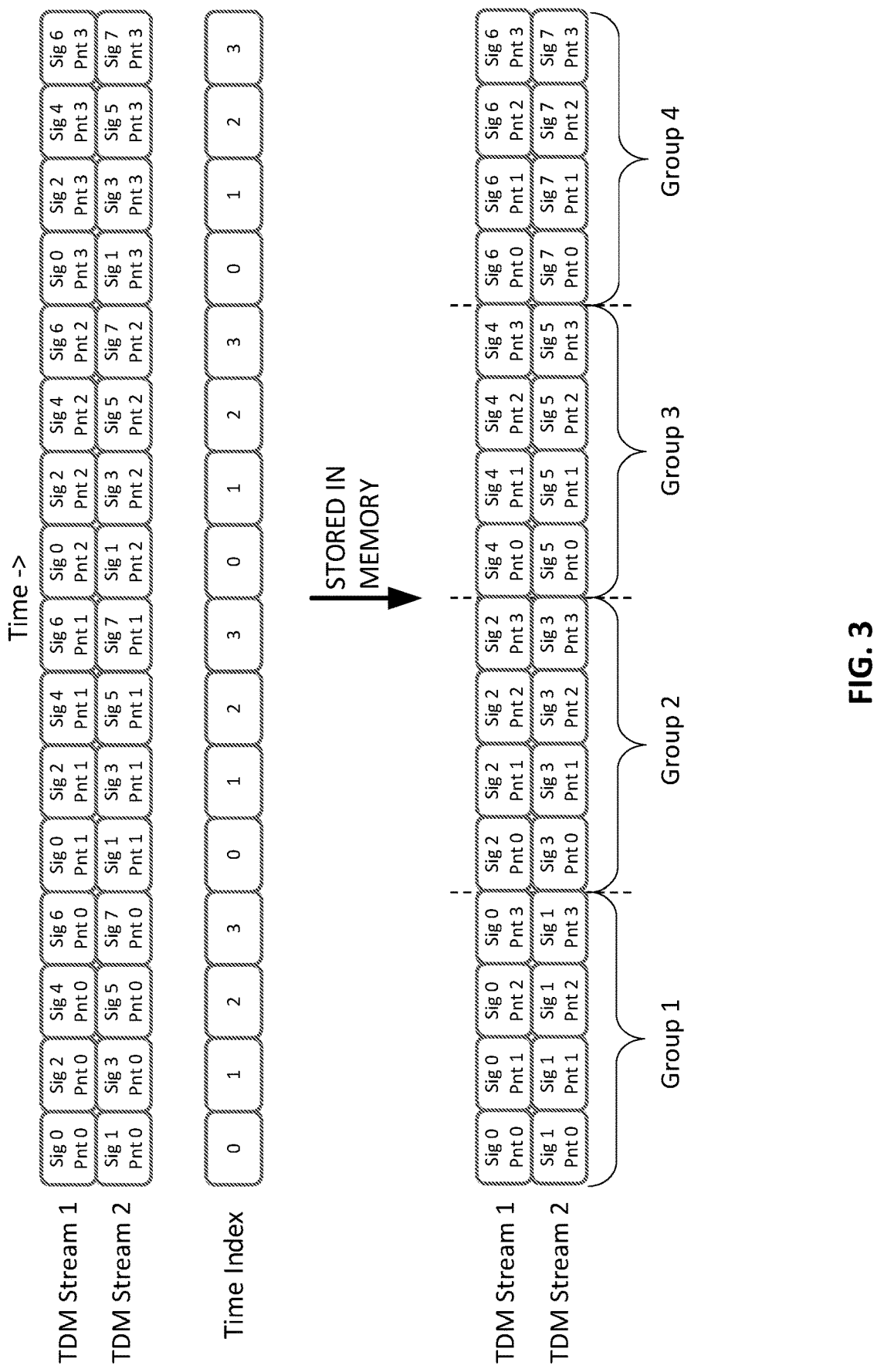
FIG. 3 illustrates example time multiplexed data streams, in accordance with some embodiments of the present disclosure.

The output of the shift register (either a '0' or '1' depending on the timing frame) is fed to the write enable input (WEN) of memory 204, according to an embodiment. The WEN input enables writing of the received data to an address determined by the time index. These inputs (WEN) and (W_addr) work together based on the time index and the output from frame counter 206 to store the signals in addressable signal groups within memory 204, thus preserving historical data points from each of the received signals. FIG. 3 illustrates an example of how the signals from both TDM data streams are stored in memory after being received. Four signal groups are created since four signals were multiplexed on each of the TDM data streams. A first signal group includes the most recent four data points from signal 0 on TDM stream 1 and the most recent four data points from signal 1 on TDM stream 2. A second signal group includes the most recent four data points from signal 2 on TDM stream 1 and the most recent four data points from signal 3 on TDM stream 2. A third signal group includes the most recent four data points from signal 4 on TDM stream 1 and the most recent four data points from signal 5 on TDM stream 2. A fourth signal group includes the most recent four data points from signal 6 on TDM stream 1 and the most recent four data points from signal 7 on TDM stream 2. Each signal group is individually addressable within memory 204. In some other embodiments, the WEN input is used to identify a memory sub address for multiple memory blocks (e.g., for use in a RAM-based memory architecture), with WEN providing a specific byte address and the W_addr input providing the more general word address.

According to some embodiments, the number of past data points that can be stored for a given signal within memory 204 is determined by the number of timing frames in the modulation scheme. For the example TDM data streams of FIG. 3, an x4 TDM scheme allows for four data points to be stored at any given time for a particular signal. The four data points include a most recently received data point, and the previous three received data points. Once four data points have been received, any further received data points of the signal will overwrite the previously stored data points such that the most recent four data points are maintained within memory 204. In some embodiments, additional past data points may be stored for a given signal using a more complex addressing scheme.

According to an embodiment, ST multiplexer 200 receives an input signal request from an application or from a user for any one of the signals on any one of the received TDM data streams. For example, an input signal request may be received for the datapoints associated with signal 4. Accordingly, ST multiplexer 200 receives the request at a decoder 208 that generates selection signals to output the data points associated with signal 4. According to an embodiment, decoder 208 generates a time select signal 210 to select a particular signal group from the stored signals in memory 204, and generates a stream select signal 212 to select one of the TDM data streams within the signal group. With reference to FIG. 3, and following the example provided above, decoder 208 may generate time select signal 210 to select Group 3 from the stored signal groups, and also generate stream select signal 212 to select TDM stream 1 in order to output the data points associated with signal 4. As will be appreciated, any requested one or more signals may be selected from amongst any number of signal groups (e.g., determined by the timing modulation scheme) and any number of TDM data streams.

According to an embodiment, decoder 208 receives a set of bits as the input signal request and decodes the received set of bits to provide a first output set of bits as time select signal 210 and a second output set of bits as stream select signal 212. In some embodiments, the number of bits needed for time select signal 210 depends on the timing modulation scheme and the number of bits needed for stream select signal 212 depends on the total number of received TDM data streams. In some embodiments, decoder 208 generates the required output bits using a look-up table stored in memory or by using combinatorial logic. Table 1 below provides examples of different inputs used to select a particular signal from any one of 8 TDM data streams having an x4 time modulation scheme.

TABLE 1

| Input (5 bits) | Time select output (2 bits) | Stream select output (3 bits) |
|---|---|---|
| 00000 | 00 | 000 |
| 00001 | 00 | 001 |
| . . . | . . . | . . . |
| 10010 | 10 | 010 |
| . . . | . . . | . . . |
| 11111 | 11 | 111 |

In the example provided in Table 1, the three least significant bits of the input signal are used to provide the stream select output and the two most significant bits of the input signal are used to provide the time select output. The bit decoding can become more complicated in situations where there are an odd number of TDM data streams to choose from. Table 2 below illustrates one example of decoding an input signal having four bits to select a signal from any one of 3 TDM data streams having an x4 time modulation scheme.

TABLE 2

| Input (4 bits) | Time select output (2 bits) | Stream select output (2 bits) |
|---|---|---|
| 0000 | 00 | 00 |
| 0001 | 00 | 01 |
| 0010 | 00 | 10 |
| 0011 | 01 | 00 |
| 0100 | 01 | 01 |
| . . . | . . . | . . . |
| 1011 | 11 | 10 |
| 1100 | Invalid | Invalid |
| 1101 | Invalid | Invalid |
| 1110 | Invalid | Invalid |
| 1111 | Invalid | Invalid |

In the example provided in Table 2, the 12 possible signal selections to be made are shifted to the first 12 input binary patterns (e.g., from 0000 to 1011) and the four remaining binary patterns (1100 to 1111) are invalidated. Another example of decoding an input signal with an odd number of TDM data streams is provided below in Table 3, using again the example of 3 TDM data streams having an x4 time modulation scheme.

TABLE 3

| Input (4 bits) | Time select output (2 bits) | Stream select output (2 bits) |
|---|---|---|
| 0000 | 00 | 00 |
| 0001 | 00 | 01 |

TABLE 3-continued

| Input (4 bits) | Time select output (2 bits) | Stream select output (2 bits) |
| --- | --- | --- |
| 0010 | 00 | 10 |
| 0011 | Invalid | Invalid |
| 0100 | 01 | 00 |
| ... | ... | ... |

In the example provided in Table 3, the two least significant bits of the input signal are used to provide the stream select output and the two most significant bits of the input signal are used to provide the time select output. Any time the two least significant bits are 11 (e.g., attempting to select a fourth TDM data stream that does not exist), the outputs are invalidated.

Time select signal 210 is received by the R_addr input of memory 204 for each received TDM data stream, according to an embodiment. The bits of time select signal 210 may be used along with appropriate logic to read from an address or addresses in memory 204 that correspond to the selected signal group. Each of the selected signal groups from each memory 204 (corresponding with each received TDM data stream) is output from each memory 204 and received as input to a multiplexer 214. The labels $Stream_0$-$Stream_n$ are provided to identify n total signal groups, with each signal group from a different TDM data stream.

Stream select signal 212 is also received as a select input into multiplexer 214 to select one of the n signal groups from the n different TDM data streams, according to an embodiment. In some examples, the bits of stream select signal 212 may be used along with appropriate logic to provide the select input to multiplexer 214. Multiplexer 214 is configured to output (via $D_{out}$) the selected signal group that contains current and past data points of the selected signal, according to an embodiment.

In some embodiments, the output from multiplexer 214 is provided to the application or user requesting the signal data. However, the signal data outputted from multiplexer 214 may not be in the correct time order (e.g., with the most recently received data at the lowest order bits). Thus, according to some embodiments, the selected signal group data outputted from multiplexer 214 is received by a data shifter 216 that shifts the data until the most recently received data is located within the lowest order bits. The data may be shifted using one or more shift registers that shift the order of the data over multiple clock cycles. In order to shift the correct number of times to bring the most recently received data to the front of the output bitstream (e.g., lowest order bits), a previous frame snapshot 218 is received by data shifter 216. Previous frame snapshot 218 may be in the same format as the output from frame counter 206, and thus may include a series of bits having a single '1' bit with the rest being '0' bits. As indicated by the name, previous frame snapshot 218 provides a previous state of frame counter 206 and provides this previous state to data shifter 216. The previous state may be used as a reference point to determine how many shifts are required to move the most recently collected signal data to the lowest order bits.

An example of the operation of data shifter 216 follows the example discussed above where signal 4 has been selected for output. If data point 1 is the most recently collected data of signal 4 at the time of the request, then the output will be temporally out of order (e.g., output is in the order of data point 0-data point 1-data point 2-data point 3, from highest order to lowest order). Thus, data shifter 216 shifts the data until data point 1 is in the position of the lowest order bits (e.g., shifted output is in the order of data point 2-data point 3-data point 0-data point 1, from highest order to lowest order).

In some embodiments, the operation of data shifter 216 is pipelined such that a different signal group is processed every clock cycle. This allows for different input signal requests to be received (e.g., a new request can be received for each clock cycle) and processed even before completing the data shifting for one of the signal requests.

Figure 4:
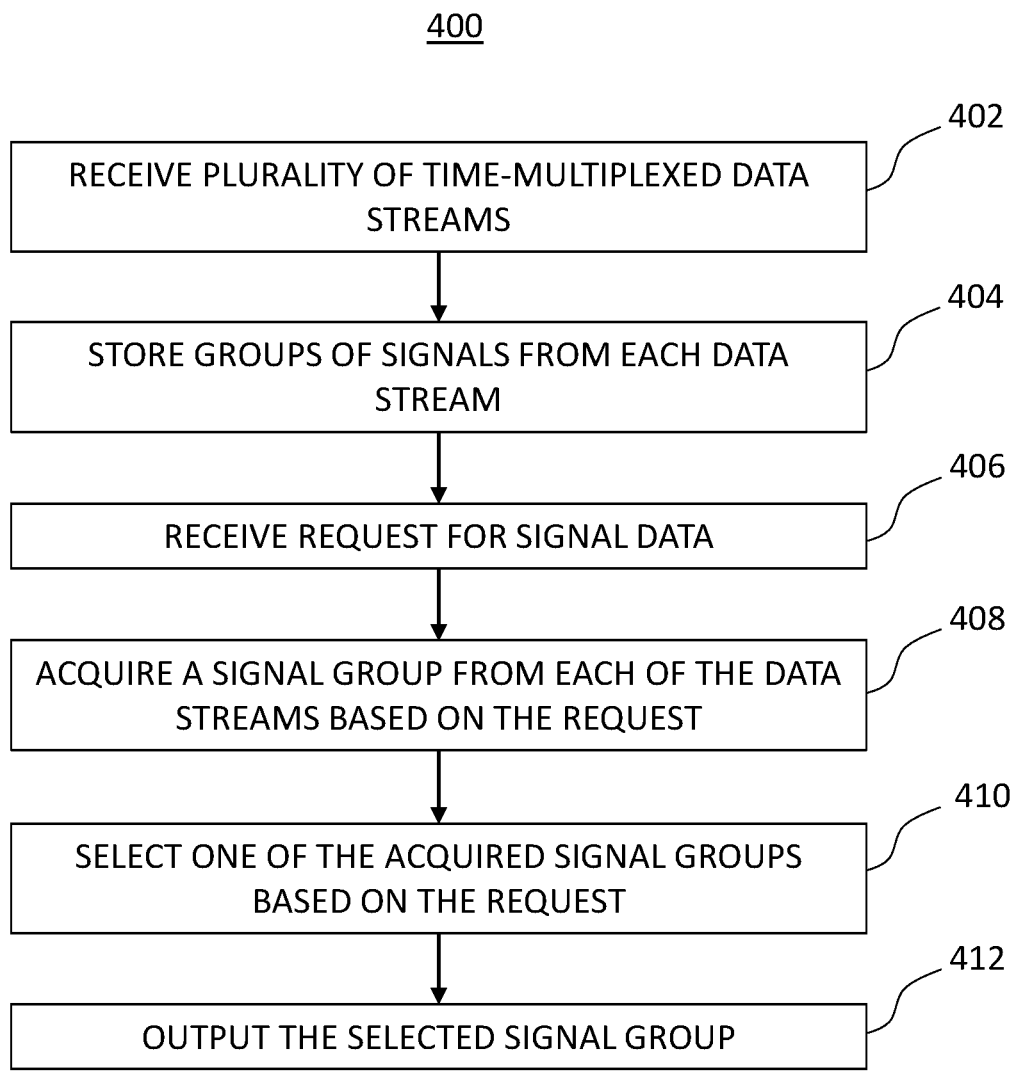
FIG. 4 is a flow chart of an example method for selecting a signal out from a plurality of time-multiplexed data streams, in accordance with some embodiments of the present disclosure.

FIG. 4 illustrates an example flow diagram for a method 400 of selecting a signal from a plurality of time-multiplexed data streams, according to an embodiment. Method 400 may be performed, for example, in whole or in part by ST multiplexer 200. The operations, functions, or actions described in the respective blocks of example method 400 may be stored as computer-executable instructions in a non-transitory computer-readable medium, such as a memory and/or a data storage of a computing system. As will be further appreciated in light of this disclosure, for this and other processes and methods disclosed herein, the functions performed in method 400 may be implemented in a differing order. Additionally, or alternatively, two or more operations may be performed at the same time or otherwise in an overlapping contemporaneous fashion.

Method 400 begins with block 402 where a plurality of TDM data streams are received. The TDM data streams can be time multiplexed with any number of time divisions. In some embodiments, the TDM data streams are received from different signal sources. In some embodiments, the TDM data streams are received from a same signal source. Each TDM data stream includes signal data for any number of different signals depending on the time multiplexing scheme.

At block 404, the signals from each of the TDM data streams are stored within memory as addressable groups, according to an embodiment. In some examples, this storage technique represents a kind of demultiplexing of the TDM data stream where the data points associated with a particular signal are stored together such that the stored group of data points can be called upon when selecting the particular signal for output. Each stored group in the memory contains data from a single signal of a given TDM data stream, according to an embodiment. For example, given a TDM data stream with an x4 time multiplexing scheme, up to four signal groups can be stored with each signal group containing the data points for one of the four signals multiplexed on the TDM data stream.

At block 406, a request is received for signal data. The request may be received from an application or from a user via some sort of user interface. In some embodiments, certain hardware components may issue a request for particular signal data. The request may be in the form of a set of bits that indicate both a particular signal group and a particular data stream from the plurality of TDM data streams. According to some embodiments, the request is decoded to generate a time select signal for selecting a signal group from each TDM data stream stored in the memory, and a stream select signal for selecting one of the TDM data streams.

At block 408, a signal group is acquired from each of the data streams based on the received request, according to an embodiment. The generated time select signal is used to select a memory address at each of the memory devices that corresponds to a signal group stored in each of the memory devices. As noted above, each of the memory devices stores the data of one of the TDM data streams, thus acquiring a signal group from each memory device is equivalent to acquiring signal data from each of the TDM data streams, according to an embodiment. The selected signal groups can be outputted collectively from the memory devices in order to have one of them selected using a multiplexer or similar architecture.

At block 410, one of the acquired signal groups is selected based on the received request, according to an embodiment. As noted above, a multiplexer may be used with the selected signal groups collectively output from the memory devices received as inputs to the multiplexer and the stream select signal used as the selection input to the multiplexer. A selection is made from amongst the selected signal groups and the selected signal group is output from the multiplexer. The selected signal group includes a most recent data point of the requested signal collected from the TDM data stream as well as past data points of the requested signal. The number of past data points in the signal group may be based on the number of time divisions in the multiplexing scheme.

At block 412, the selected signal group is output to be received by the requesting application or user, according to an embodiment. The outputted data includes the most recent data point of the requested signal as well as past data points of the requested signal due in part to how the TDM data streams are stored within memory when they are received. According to some embodiments, the outputted data may be shifted to ensure that the most recently received data is placed at the front of the outputted data stream (e.g., at the location of the lowest order bits).

Figure 5:
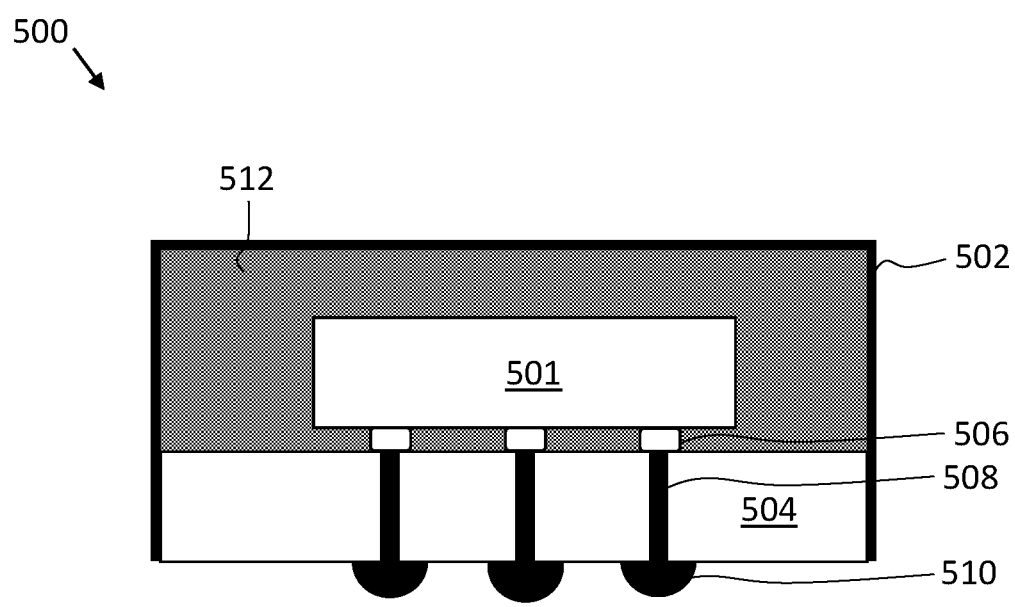
FIG. 5 illustrates a block diagram of a chip package that includes the spatial and time multiplexing device of FIG. 2, in accordance with an embodiment of the present disclosure.

FIG. 5 illustrates an example embodiment of a chip package 500. As can be seen, chip package 500 may be a system-in-package (SIP) that includes an integrated circuit (IC) die 501. Other dies may be included as well within chip package 500 and coupled to the same package substrate 504. In some embodiments, IC die 501 includes at least ST multiplexer 200. As can be further seen, chip package 500 includes a housing 502 that is bonded to package substrate 504. Housing 502 may be any material that provides environmental protection for the components of chip package 500. IC die 501 may be conductively coupled to package substrate 504 using connections 506. In some embodiments, connections 506 represent any standard or proprietary connection mechanism, such as solder bumps, ball grid array (BGA), pins, or wire bonds, to name a few examples. Package substrate 504 may include a dielectric material having conductive pathways (e.g., including conductive vias and lines) extending through the dielectric material between the faces of package substrate 504, or between different locations on each face. For example, package substrate 504 may include multiple stacked layers of dielectric material with conductive traces running surfaces of one or more of the layers of dielectric material, and one or more conductive vias extending between any number of the layers of dielectric material. In some embodiments, package substrate 504 may have a thickness less than 1 millimeter (e.g., between 0.1 millimeters and 0.5 millimeters), although any number of package geometries can be used. Additional conductive contacts 510 may be disposed at an opposite face of package substrate 504 for conductively contacting, for instance, a printed circuit board or another chip package. One or more vias 508 extend through a thickness of package substrate 504 to provide conductive pathways between one or more of connections 506 to one or more of contacts 510. Vias 508 may be single straight columns (as illustrated), however, other configurations can be used (e.g., damascene, dual damascene, through-silicon via). In still other embodiments, vias 508 are fabricated by multiple smaller stacked vias, or are staggered at different locations across various ones of the stacked dielectric layers of package substrate 504. Contacts 510 may be solder balls (e.g., for bump-based connections or a ball grid array arrangement), but any suitable package bonding mechanism may be used (e.g., pins in a pin grid array arrangement or lands in a land grid array arrangement). In some embodiments, a solder resist is disposed between contacts 510, to inhibit shorting.

In some embodiments, a mold material 512 may be disposed around IC die 501 included within housing 502. In some embodiments, mold material 512 is included between IC die 501 and package substrate 504 as an underfill material, as well as between IC die 501 and housing 502 as an overfill material. The dimensions and qualities of mold material 512 can vary depending on the type of chip package used and the environment the package is used in. In some embodiments, a thickness of mold material 512 is less than 1 millimeter. Example materials that may be used for mold material 512 include epoxy mold materials. In some cases, mold material 512 is thermally conductive, in addition to being electrically insulating.

Example Computing Platform

Figure 6:
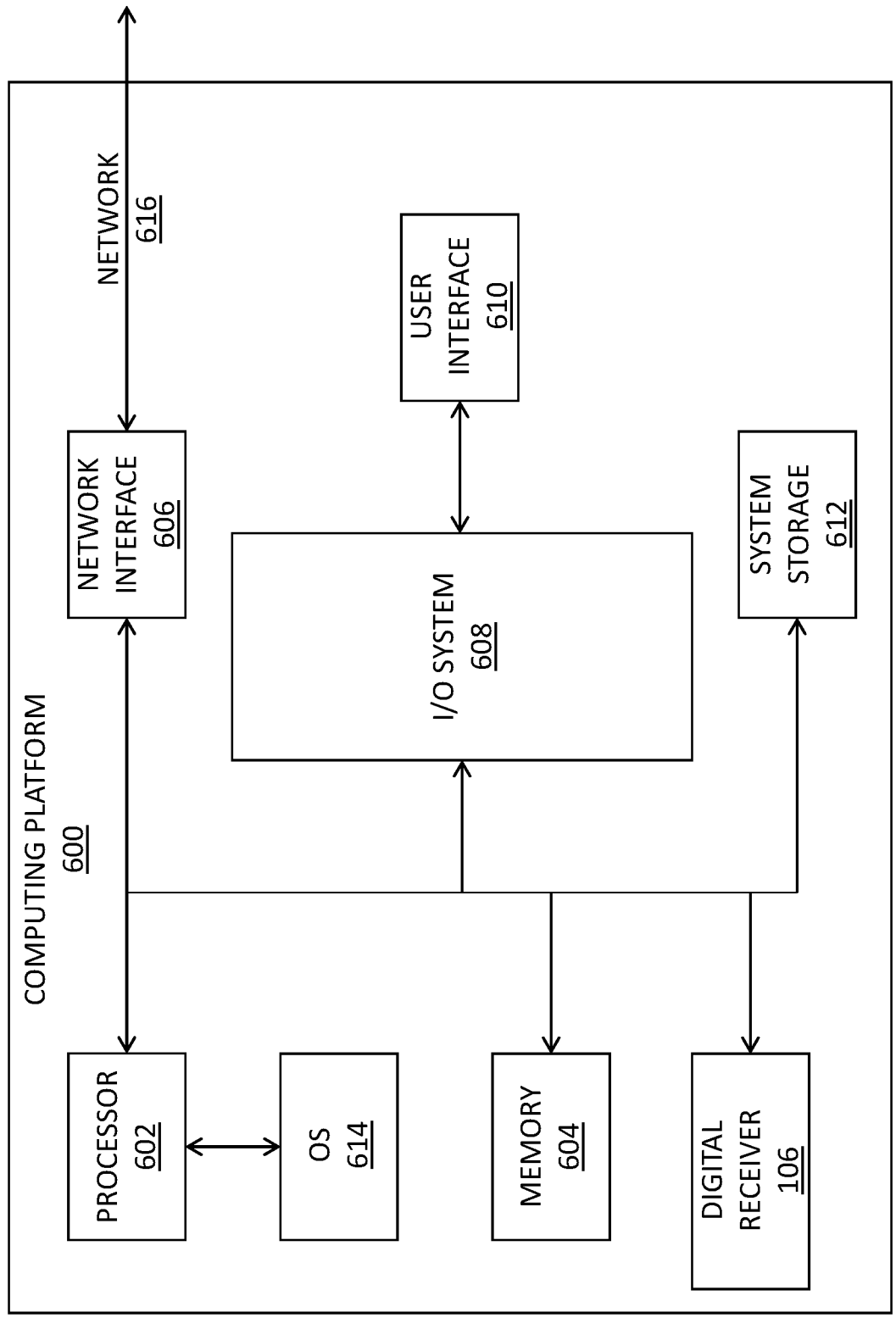
FIG. 6 illustrates a block diagram of an example computing platform that may include a spatial and time multiplexing device, in accordance with an embodiment of the present disclosure.

FIG. 6 illustrates an example computing platform 600 that may include digital receiver 106, in accordance with certain embodiments of the present disclosure. In some embodiments, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. As noted above, digital receiver 106 may include ST multiplexer 200 configured to select a data signal from amongst a plurality of TDM data streams and receive both current and past data points of the selected signal.

In some embodiments, computing platform 600 may comprise any combination of a processor 602, a memory 604, digital receiver 106, a network interface 606, an input/output (I/O) system 608, a user interface 610, and a storage system 612. In some embodiments, digital receiver 106 is implemented as part of processor 602. As can be further seen, a bus and/or interconnect is also provided to allow for communication between the various components listed above and/or other components not shown. Computing platform 600 can be coupled to a network 616 through network interface 606 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

Processor 602 can be any suitable processor and may include one or more coprocessors or controllers to assist in control and processing operations associated with computing platform 600. In some embodiments, processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 604 can be implemented using any suitable type of digital storage including, for example, flash memory and/or random access memory (RAM). In some embodiments, memory 604 may include various layers of memory hierarchy and/or memory caches as are known to those of skill in the art. Memory 604 may be implemented as a volatile memory device such as, but not limited to, a RAM, dynamic RAM (DRAM), or static RAM (SRAM) device. Storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 612 may comprise technology to increase the storage performance enhanced protection for valuable digital media when multiple hard drives are included.

Processor 602 may be configured to execute an Operating System (OS) 614 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing platform 600, and therefore may also be implemented using any suitable existing or subsequently-developed platform.

Network interface 606 can be any appropriate network chip or chipset which allows for wired and/or wireless connection between other components of computing platform 600 and/or network 616, thereby enabling computing platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 608 may be configured to interface between various I/O devices and other components of computing platform 600. I/O devices may include, but not be limited to, a user interface 610. User interface 610 may include devices (not shown) such as a display element, touchpad, keyboard, mouse, and speaker, etc. I/O system 608 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 602 or any chipset of computing platform 600.

It will be appreciated that in some embodiments, the various components of the computing platform 600 may be combined or integrated in a system-on-a-chip (SoC) architecture. In some embodiments, the components may be hardware components, firmware components, software components or any suitable combination of hardware, firmware or software.

In various embodiments, computing platform 600 may be implemented as a wireless system, a wired system, or a combination of both. When implemented as a wireless system, computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, is a functional apparatus and may comprise, for example, singly or in any combination, hardwired circuitry, programmable circuitry such as one or more computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software stored in a machine-readable medium and that can be executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Thus, a circuit or circuitry is a functional physical apparatus that can be any of integrated circuitry, printed circuit board circuitry, gate-level logic, analog and/or digital circuitry, one or more programmed processors or processing entities (e.g., combination of instructions and one or more processors configured to execute those instructions).

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a digital receiver configured to receive a plurality of time-multiplexed data streams. The digital receiver includes a plurality of memory devices and a multiplexer. Each of the plurality of memory devices is configured to receive a given data stream of the plurality of time-multiplexed data streams, wherein the given data stream includes time-multiplexed data from a plurality of sources; store data of the given data stream within a plurality of groups, wherein each group contains data from a different source of the plurality of sources; receive a time select signal and select a group of the plurality of groups based on the time select signal; and output the data from the selected group as a signal group. The multiplexer is configured to receive the signal group from each of the plurality of memory devices; select one of the received signal groups associated with one of the plurality of memory devices in response to a received stream select signal; and output the selected signal group.

Example 2 includes the subject matter of Example 1, wherein each of the plurality of groups is separately addressable.

Example 3 includes the subject matter of Example 1 or 2, wherein each group only contains data from one source of the plurality of sources.

Example 4 includes the subject matter of any one of Examples 1-3, further comprising a decoder that is configured to receive an input requesting specific time-selective data, determine the time select signal and the stream select signal based on the input, output the time select signal received by each of the plurality of memory devices, and output the stream select signal received by the multiplexer.

Example 5 includes the subject matter of any one of Examples 1-4, further comprising a data shifter that is configured to receive the selected signal group, and shift the data within the selected signal group such that the most recently received data is in the lowest order bits of the selected signal group.

Example 6 includes the subject matter of any one of Examples 1-5, further comprising a shift register configured to track a time index of the plurality of time-multiplexed data streams.

Example 7 includes the subject matter of any one of Examples 1-6, wherein the plurality of sources comprises a plurality of analog-to-digital converters.

Example 8 includes the subject matter of any one of Examples 1-7, wherein the plurality of memory devices comprises a plurality of dual-port random access memory (RAM) devices.

Example 9 is an integrated circuit that includes the digital receiver of any one of Examples 1-8.

Example 10 is a system-in-package (SIP) device that includes a package substrate and one or more integrated circuit chips coupled to the package substrate. The one or more integrated circuit chips includes a plurality of memory devices and a multiplexer. Each of the plurality of memory devices is configured to receive a given data stream of the plurality of time-multiplexed data streams, wherein the given data stream includes time-multiplexed data from a plurality of sources; store data of the given data stream within a plurality of groups, wherein each group contains data from a different source of the plurality of sources; receive a time select signal and select a group of the plurality of groups based on the time select signal; and output the data from the selected group as a signal group. The multiplexer is configured to receive the signal group from each of the plurality of memory devices; select one of the received signal groups associated with one of the plurality of memory devices in response to a received stream select signal; and output the selected signal group.

Example 11 includes the subject matter of Example 10, wherein each of the plurality of groups is separately addressable.

Example 12 includes the subject matter of Example 10 or 11, wherein each group only contains data from one source of the plurality of sources.

Example 13 includes the subject matter of any one of Examples 10-12, wherein the one or more integrated circuit chips further comprises a decoder configured to receive an input requesting specific time-selective data, determine the time select signal and the stream select signal based on the input, output the time select signal received by each of the plurality of memory devices, and output the stream select signal received by the multiplexer.

Example 14 includes the subject matter of any one of Examples 10-13, wherein the one or more integrated circuit chips further comprises a data shifter configured to receive the selected signal group, and shift the data within the selected signal group such that the most recently received data is in the lowest order bits of the selected signal group.

Example 15 includes the subject matter of any one of Examples 10-14, wherein the one or more integrated circuit chips further comprises a shift register configured to track a time index of the plurality of time-multiplexed data streams.

Example 16 includes the subject matter of any one of Examples 10-15, wherein the plurality of sources comprises a plurality of analog-to-digital converters.

Example 17 includes the subject matter of any one of Examples 10-16, wherein the plurality of memory devices comprises a plurality of dual-port random access memory (RAM) devices.

Example 18 is a method for selecting a signal out from a plurality of time-multiplexed data streams. The method includes receiving the time-multiplexed data streams at corresponding memory devices, wherein the time-multiplexed data streams each include a plurality of multiplexed signals; storing each signal of the plurality of multiplexed signals of each of the time-multiplexed data streams in the corresponding memory device, such that the data from each signal is stored as a signal group; receiving an input requesting specific time-selective data; acquiring one of the signal groups from each of the memory devices based on the input; selecting one of the acquired signal groups from a corresponding memory device based on the input; and outputting the selected signal group.

Example 19 includes the subject matter of Example 18, wherein each signal group only contains data from one signal of the plurality of multiplexed signals.

Example 20 includes the subject matter of Example 18 or 19, wherein each of the stored signal groups is separately addressable.

Example 21 includes the subject matter of any one of Examples 18-20, further comprising receiving an input requesting specific time-selective data, and determining a time select signal and a stream select signal based on the input, wherein the acquiring comprises acquiring the one of the signal groups from each of the memory devices based on the time select signal, and wherein the selecting comprises selecting the one of the acquired signal groups from a corresponding memory device based on the stream select signal.

Example 22 includes the subject matter of any one of Examples 18-21, further comprising shifting the data within the selected signal group such that the most recently received data is in the lowest order bits of the selected signal group.

Example 23 includes the subject matter of any one of Examples 18-22, further comprising tracking a time index of the plurality of time-multiplexed data streams using a shift register.

What is claimed is:

1. A digital receiver configured to receive a plurality of time-multiplexed data streams, the digital receiver comprising:
    a plurality of memory devices, wherein each memory device of the plurality of memory devices is configured to
        receive a given data stream of the plurality of time-multiplexed data streams, wherein the given data stream includes time-multiplexed data from a plurality of sources;
        store data of the given data stream within a plurality of groups, wherein each group contains data from a different source of the plurality of sources;
        receive a time select signal and select a group of the plurality of groups based on the time select signal; and
        output the data from the selected group as a signal group; and
    a multiplexer configured to
        receive the signal group from each of the plurality of memory devices;
        select one of the received signal groups associated with one of the plurality of memory devices in response to a received stream select signal; and
        output the selected signal group.

2. The digital receiver of claim 1, wherein each of the plurality of groups is separately addressable.

3. The digital receiver of claim 1, wherein each group only contains data from one source of the plurality of sources.

4. The digital receiver of claim 1, further comprising a decoder configured to receive an input requesting specific time-selective data,
    determine the time select signal and the stream select signal based on the input,
    output the time select signal received by each of the plurality of memory devices, and
    output the stream select signal received by the multiplexer.

5. The digital receiver of claim 1, further comprising a data shifter configured to receive the selected signal group; and
    shift the data within the selected signal group such that the most recently received data is in the lowest order bits of the selected signal group.

6. The digital receiver of claim 1, further comprising a shift register configured to track a time index of the plurality of time-multiplexed data streams.

7. The digital receiver of claim 1, wherein the plurality of sources comprises a plurality of analog-to-digital converters.

8. The digital receiver of claim 1, wherein the plurality of memory devices comprises a plurality of dual-port random access memory (RAM) devices.

9. An integrated circuit comprising the digital receiver of claim 1.

10. A system-in-package (SIP) device, comprising:
    a package substrate; and
    one or more integrated circuit chips coupled to the package substrate and comprising a plurality of memory devices, wherein each memory device of the plurality of memory devices is configured to
- receive a given data stream of a plurality of time-multiplexed data streams, wherein the given data stream includes time-multiplexed data from a plurality of sources;
- store data of the given data stream within a plurality of groups, wherein each group contains data from a different source of the plurality of sources;
- receive a time select signal and select a group of the plurality of groups based on the time select signal; and
- output the data from the selected group as a signal group; and a multiplexer configured to
- receive the signal group from each of the plurality of memory devices;
- select one of the received signal groups associated with one of the plurality of memory devices in response to a received stream select signal; and
- output the selected signal group.

11. The SIP device of claim 10, wherein each of the plurality of groups is separately addressable.

12. The SIP device of claim 10, wherein each group only contains data from one source of the plurality of sources.

13. The SIP device of claim 10, wherein the one or more integrated circuit chips further comprises a decoder configured to
- receive an input requesting specific time-selective data,
- determine the time select signal and the stream select signal based on the input,
- output the time select signal received by each of the plurality of memory devices, and
- output the stream select signal received by the multiplexer.

14. The SIP device of claim 10, wherein the one or more integrated circuit chips further comprises a data shifter configured to
- receive the selected signal group; and
- shift the data within the selected signal group such that the most recently received data is in the lowest order bits of the selected signal group.

15. The SIP device of claim 10, wherein the one or more integrated circuit chips further comprises a shift register configured to track a time index of the plurality of time-multiplexed data streams.

16. The SIP device of claim 10, wherein the plurality of sources comprises a plurality of analog-to-digital converters.

17. The SIP device of claim 10, wherein the plurality of memory devices comprises a plurality of dual-port random access memory (RAM) devices.

18. A method for selecting a signal out from a plurality of time-multiplexed data streams, the method comprising:
- receiving the time-multiplexed data streams at corresponding memory devices, wherein the time-multiplexed data streams each include a plurality of multiplexed signals;
- storing each signal of the plurality of multiplexed signals of each of the time-multiplexed data streams in the corresponding memory device, such that the data from each signal is stored as a signal group;
- receiving an input requesting specific time-selective data;
- acquiring one of the signal groups from each of the memory devices based on the input;
- selecting one of the acquired signal groups from a corresponding memory device based on the input; and
- outputting the selected signal group.

19. The method of claim 18, wherein each signal group only contains data from one signal of the plurality of multiplexed signals.

20. The method of claim 18, further comprising
- receiving an input requesting specific time-selective data; and
- determining a time select signal and a stream select signal based on the input,
- wherein the acquiring comprises acquiring the one of the signal groups from each of the memory devices based on the time select signal, and
- wherein the selecting comprises selecting the one of the acquired signal groups from a corresponding memory device based on the stream select signal.

* * * * *